(12) United States Patent
Jung et al.

(10) Patent No.: US 11,006,238 B1
(45) Date of Patent: May 11, 2021

(54) METHOD FOR PROFILING BASED ON FOOTHOLD AND TERMINAL USING THE SAME

(71) Applicant: LG ELECTRONICS INC., Seoul (KR)

(72) Inventors: Boosoon Jung, Seongnam-si (KR); Choong Hoe Jo, Seoul (KR); Soora Bang, Seoul (KR); Jin Sang Lee, Seoul (KR); Joongkeun Kim, Incheon (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/816,798

(22) Filed: Mar. 12, 2020

(30) Foreign Application Priority Data

Dec. 18, 2019 (KR) ........................ 10-2019-0170026

(51) Int. Cl.
| | | |
|---|---|---|
| *H04W 72/04* | (2009.01) | |
| *H04W 4/029* | (2018.01) | |
| *H04W 48/16* | (2009.01) | |
| *H04W 4/021* | (2018.01) | |
| *H04W 8/18* | (2009.01) | |
| *H04W 64/00* | (2009.01) | |
| *H04W 88/18* | (2009.01) | |
| *H04W 4/02* | (2018.01) | |
| *H04W 4/80* | (2018.01) | |
| *H04W 84/18* | (2009.01) | |
| *H04W 88/06* | (2009.01) | |

(52) U.S. Cl.
CPC ........... *H04W 4/021* (2013.01); *H04W 4/025* (2013.01); *H04W 4/029* (2018.02); *H04W 4/80* (2018.02); *H04W 8/18* (2013.01); *H04W 64/003* (2013.01); *H04W 84/18* (2013.01); *H04W 88/06* (2013.01); *H04W 88/18* (2013.01)

(58) Field of Classification Search
CPC ......... H04W 4/029; H04W 4/80; H04W 4/02; H04W 64/00; H04W 4/021; H04W 4/21; H04W 64/003; H04W 76/11; H04W 76/25; H04W 28/0226; H04W 76/10; H04W 88/02; H04W 88/08
See application file for complete search history.

(56) References Cited

U.S. PATENT DOCUMENTS

| | | | |
|---|---|---|---|
| 2013/0091452 A1* | 4/2013 | Sorden | ...................... G06N 5/04 715/771 |
| 2016/0112957 A1* | 4/2016 | Boothroyd | ............ H04W 4/027 455/574 |

(Continued)

FOREIGN PATENT DOCUMENTS

| | | |
|---|---|---|
| KR | 10-1494164 B1 | 2/2015 |
| KR | 10-1945258 B1 | 2/2019 |

*Primary Examiner* — Gary Lafontant
(74) *Attorney, Agent, or Firm* — Birch, Stewart, Kolasch & Birch, LLP

(57) ABSTRACT

Disclosed are a foothold-based profiling method and a terminal using the same. A foothold-based profiling method includes collecting information about an event, collecting location information of a terminal when an event occurs, selecting a foothold based on location information, and collecting information about the foothold. According to the present disclosure, footholds may be determined based on connectivity related events of the terminal, and profiling information may be collected in regards to movement between the footholds.

20 Claims, 12 Drawing Sheets

(56) References Cited

U.S. PATENT DOCUMENTS

| | | | |
|---|---|---|---|
| 2017/0068857 A1* | 3/2017 | Lee | G06F 16/162 |
| 2019/0045331 A1* | 2/2019 | Liang | H04W 4/029 |
| 2019/0297628 A1* | 9/2019 | Kato | H04W 64/00 |

* cited by examiner

[FIG. 1]
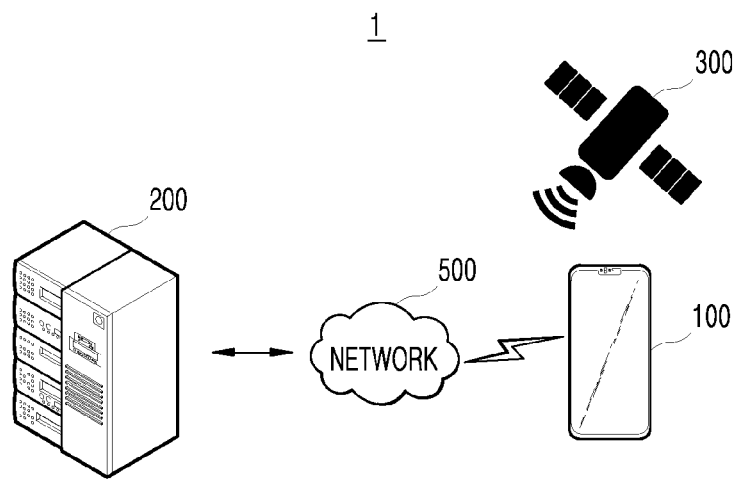

[FIG. 2]
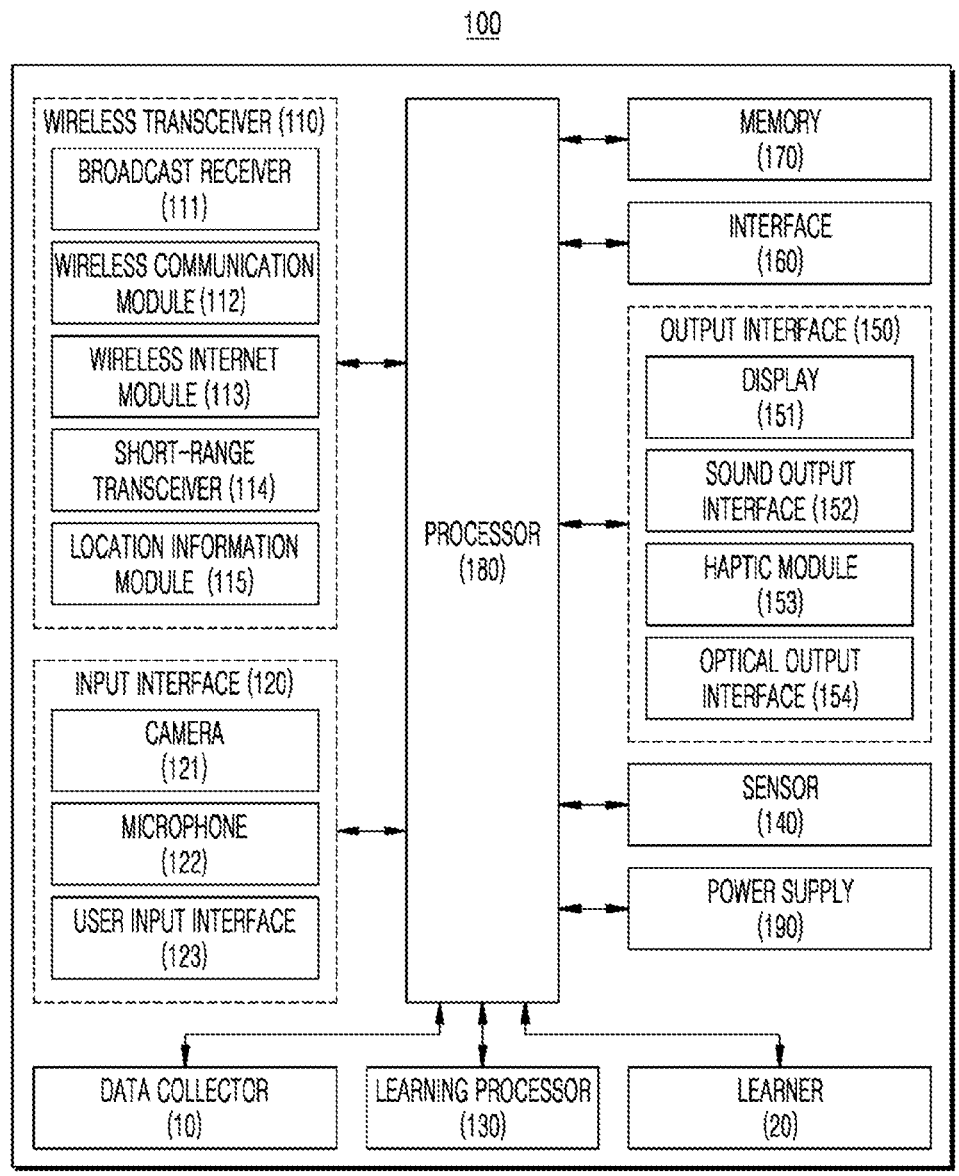

[FIG. 3]
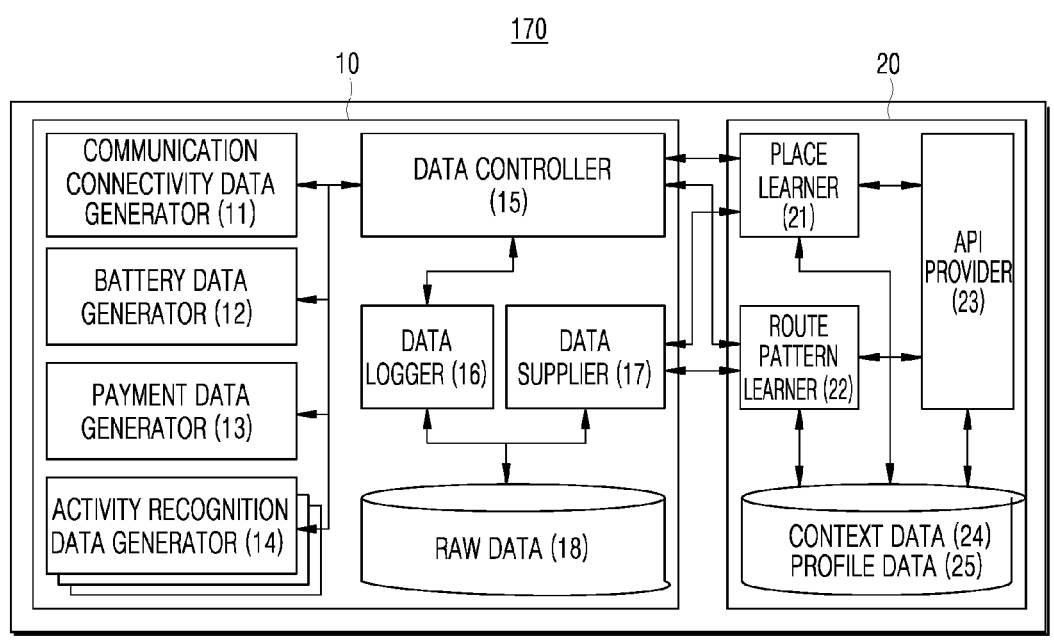

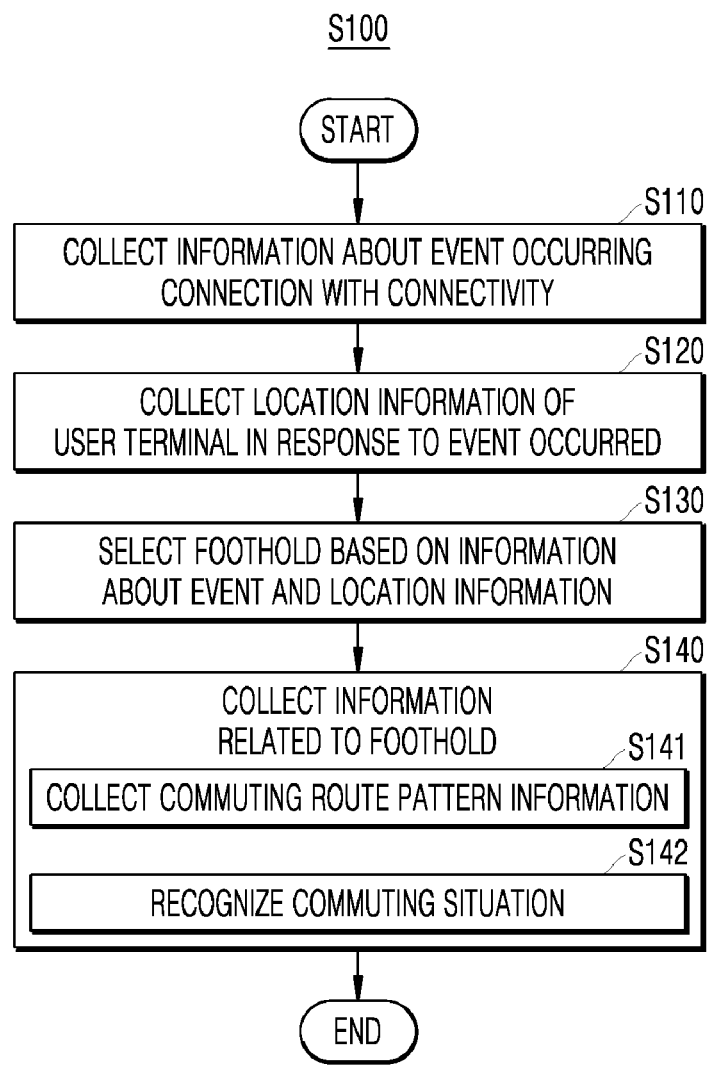

[FIG. 5]

| | TYPE | CONDITION | COLLECTION DATA |
|---|---|---|---|
| 1 | BT | • WHEN BT DEVICE IS ATTACHED<br>• WHEN BT DEVICE IS DETACHED | BT ADDRESS, BT NAME, BT TYPE, CONNECTION STATE, ATTACH TIME |
| 2 | WiFi | • WHEN ATTACHED TO WiFi AP<br>• WHEN DETACHED FROM WiFi AP | BSSID, SSID, NAME, SIGNAL STRENGTH, ATTACH TIME |
| 3 | SMS | • WHEN RECEIVING PAYMENT TEXT | PHONE NUMBER, MESSAGE CONTENT, SHOP NAME, AND RECEPTION TIME |
| 4 | CELL ID | • WHEN ID OF ATTACHED LTE/3G CELL IS CHANGED | CELL INFORMATION INCLUDING FOR EXAMPLE CELL TYPE, LAC, CID, PSC AND BASEL |
| 5 | BATTERY | • WHEN CHARGE CABLE IS CONNECTED<br>• WHEN CHARGE CABLE IS DISCONNECTED | CHARGE CABLE CONNECTION SITUATION, CONNECTION TIME, CHARGER TYPE |
| 6 | STAY | • WHEN STAYING FOR MORE THAN 30 MINUTES IN ONE AREA<br>• MOVEMENT DETERMINATION CONDITION:<br>PREVIOUS COORDINATE (A), CURRENT COORDINATE (B)<br>• ACCURACY OF A + ACCURACY OF<br>B + 10 m + GPS ERROR RATE (10 m) | LATITUDE, LONGITUDE, ACCURACY, ALTITUDE, TIME CORRECT TO AVERAGE VALUE OF GPS INFORMATION RECOGNIZED DURING TIME STAYED |

[FIG. 6]
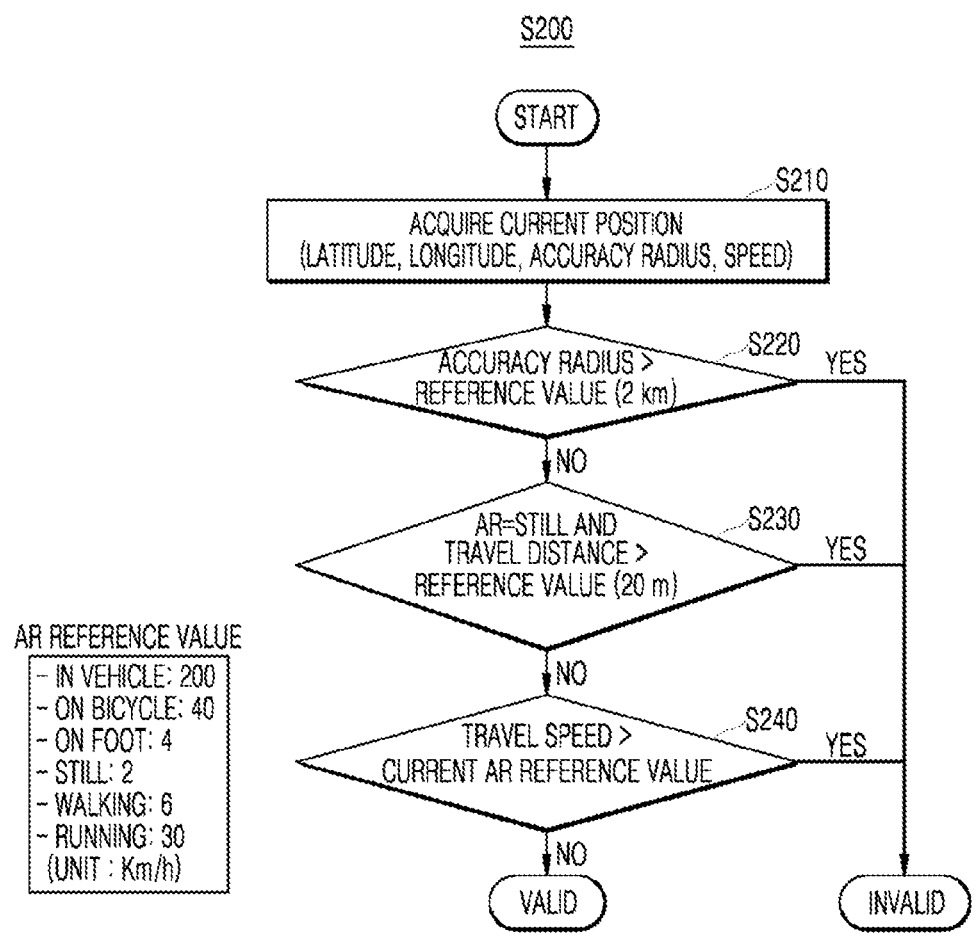

[FIG. 7]
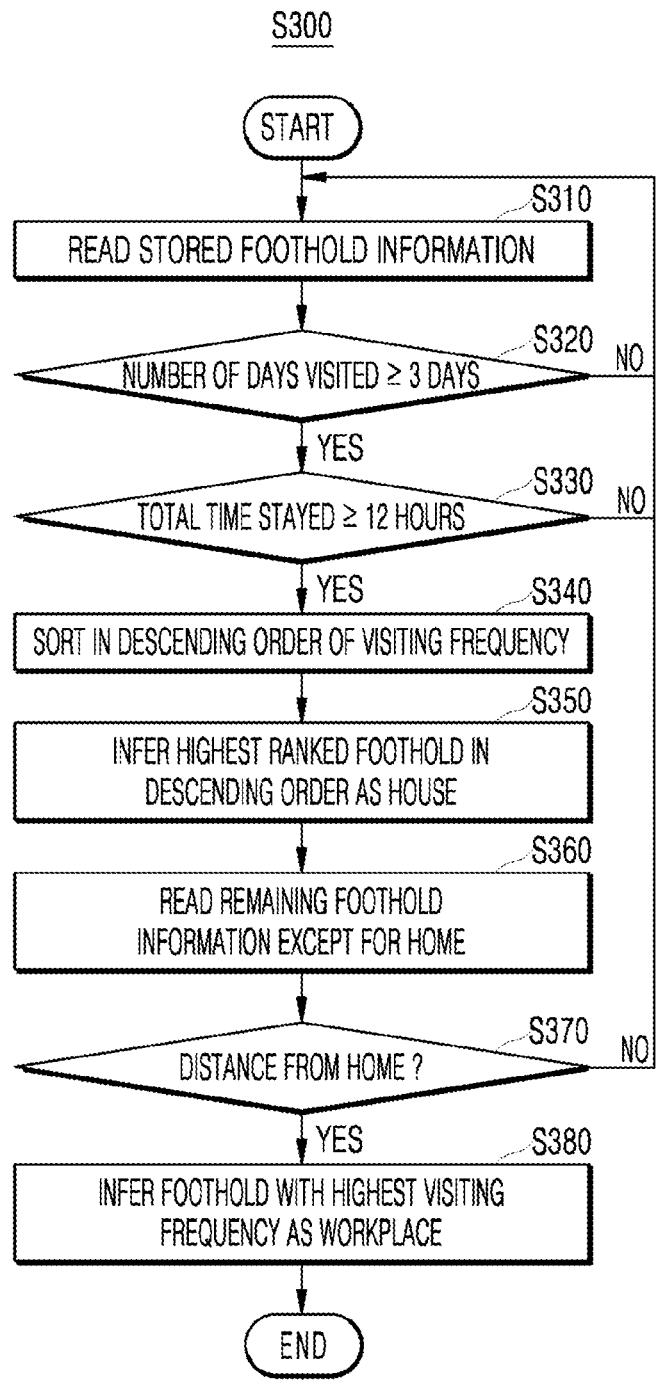

[FIG. 8]
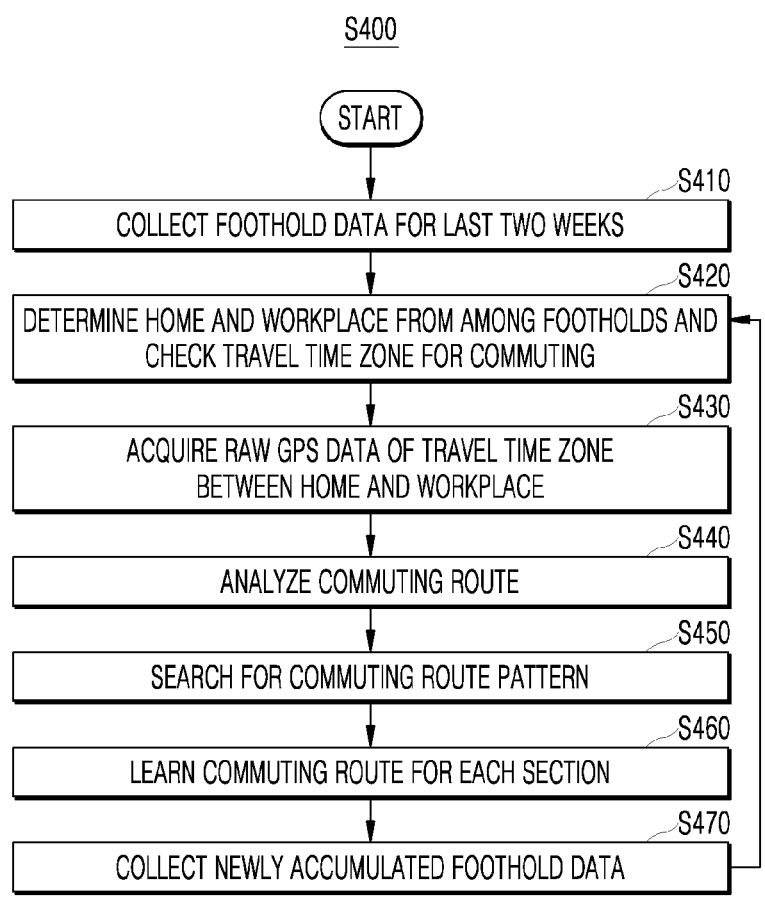

[FIG. 9]
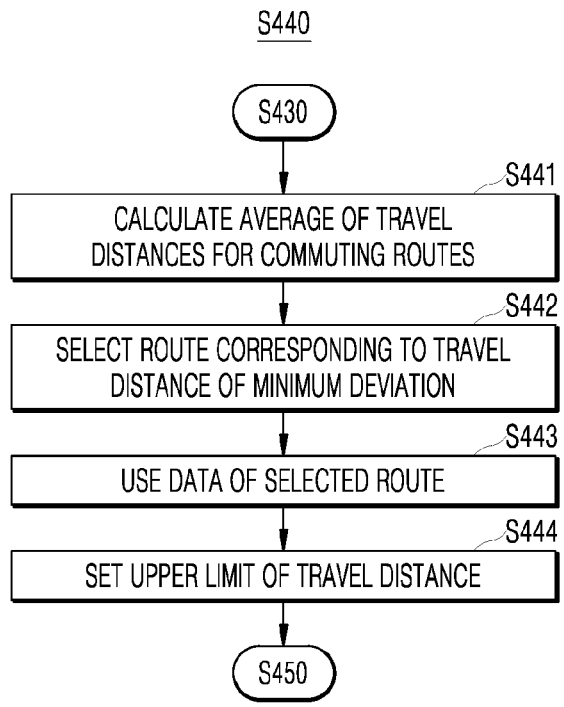
[FIG. 10]
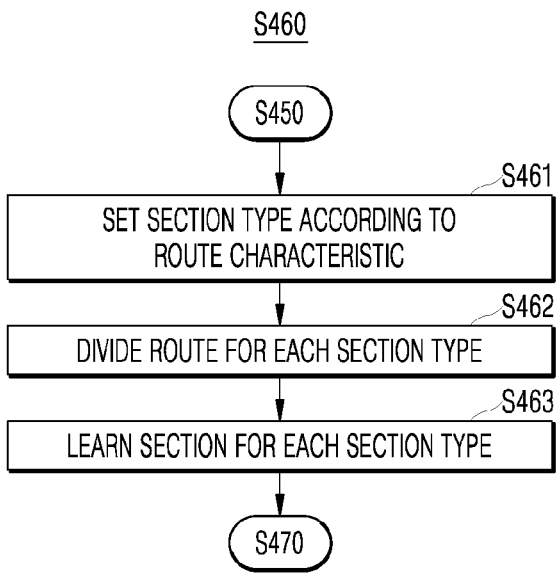

[FIG. 11]
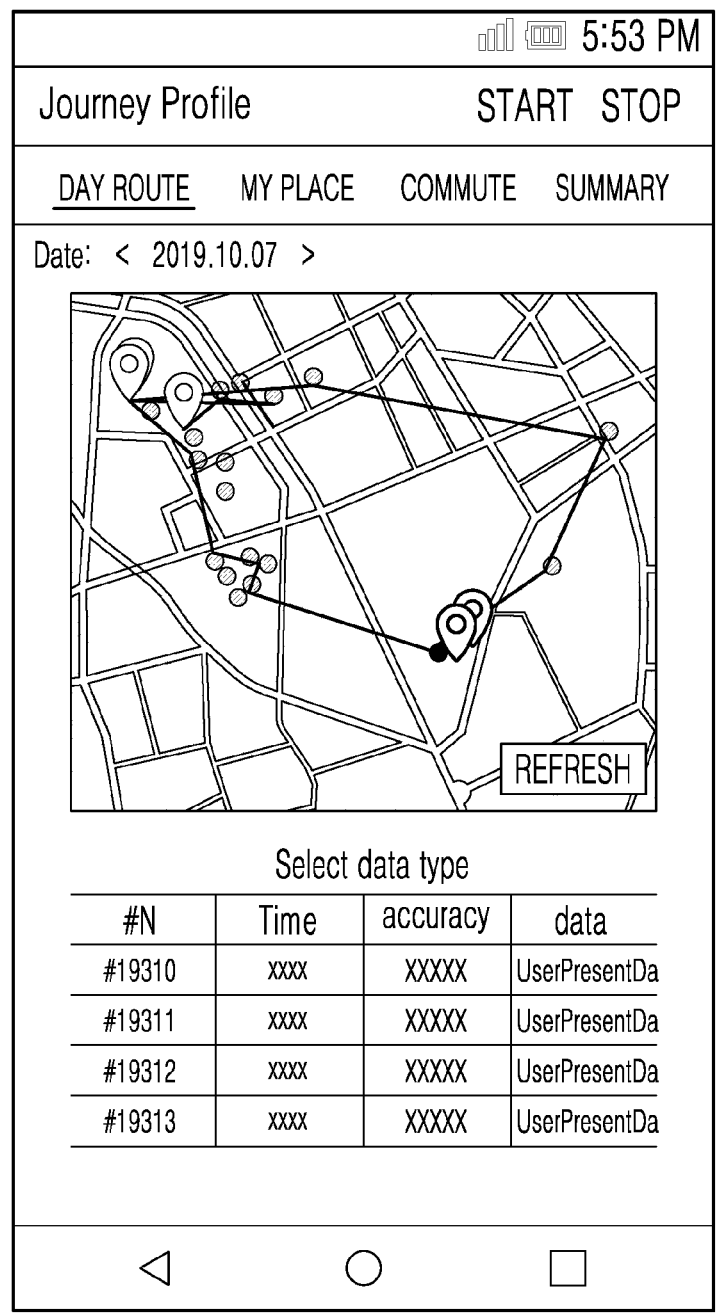

[FIG. 12]
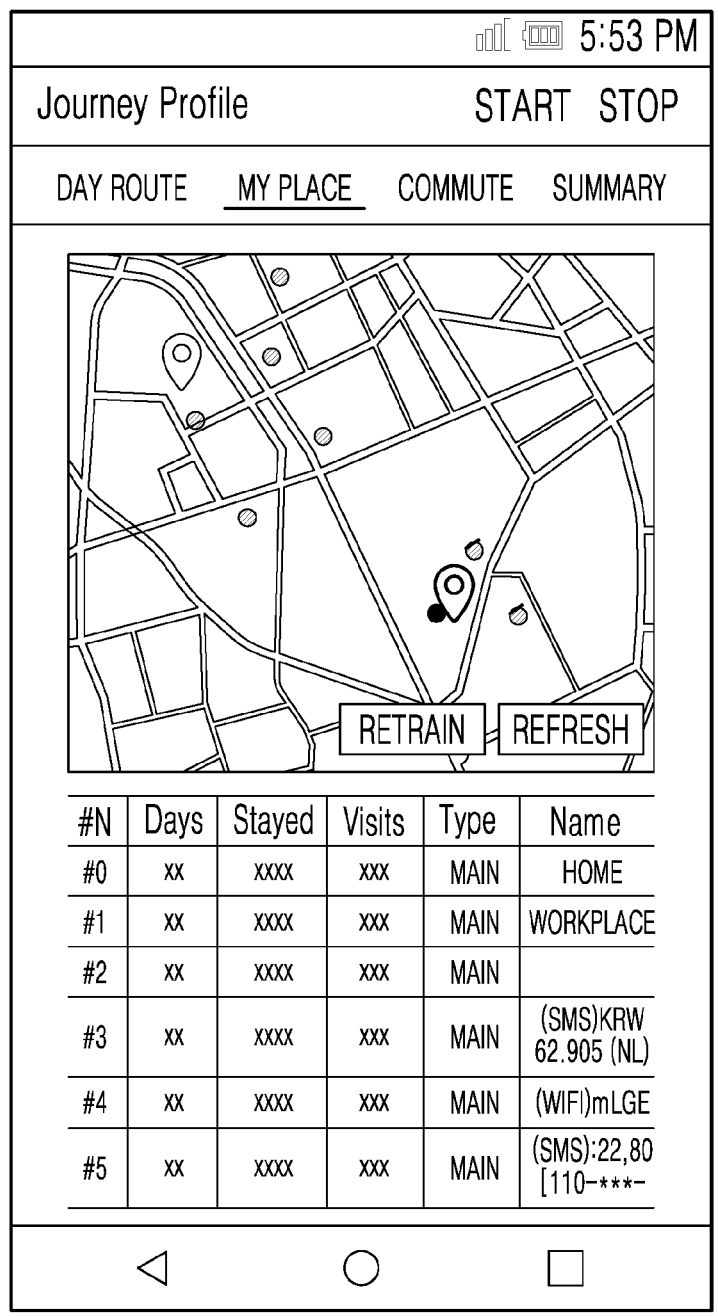

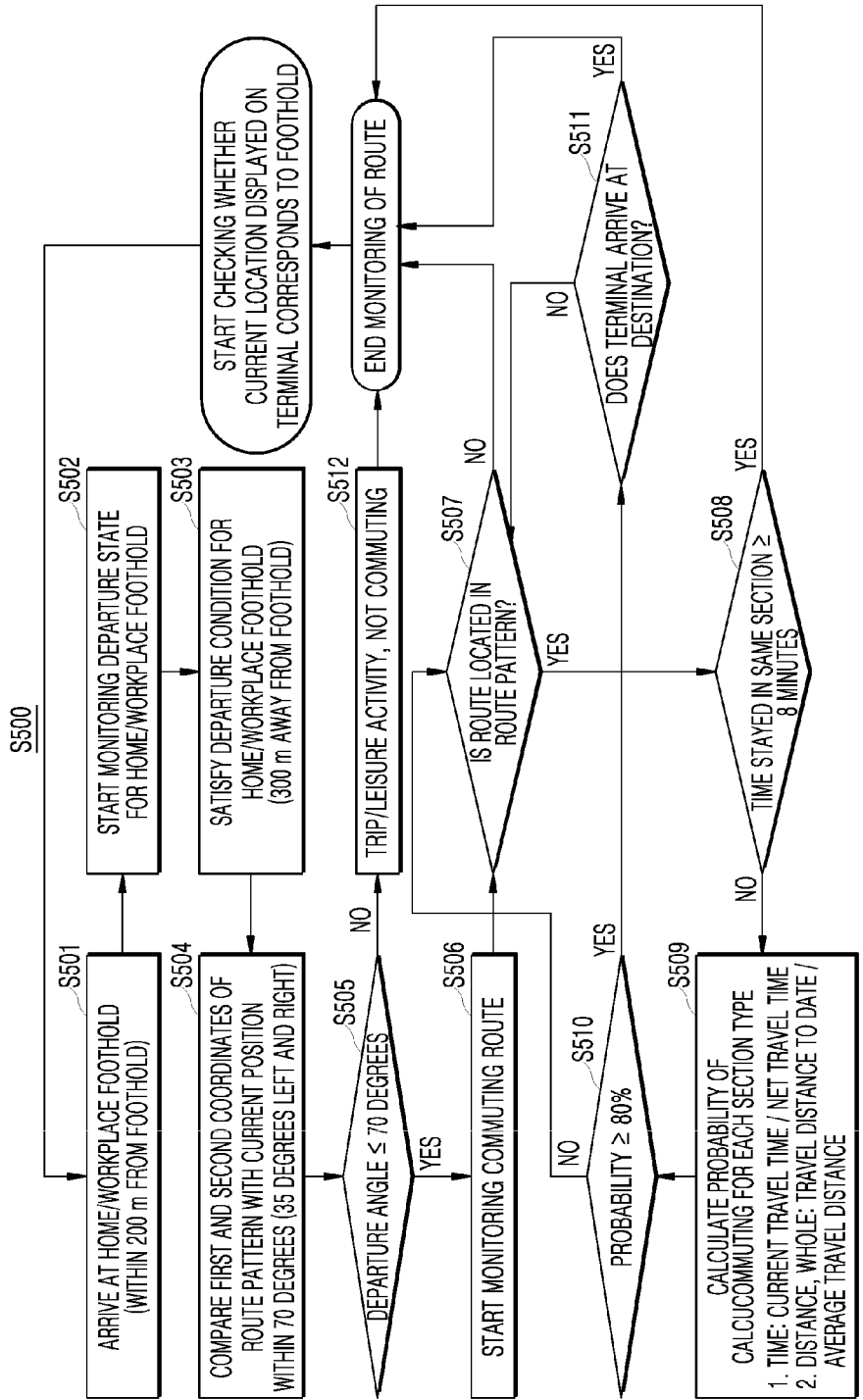
[FIG. 13]

METHOD FOR PROFILING BASED ON FOOTHOLD AND TERMINAL USING THE SAME

CROSS-REFERENCE TO RELATED APPLICATION

The present application claims benefit of priority to Korean Patent Application No. 10-2019-0170026, entitled "METHOD FOR PROFILING BASED ON FOOTHOLD AND TERMINAL USING THE SAME" filed on Dec. 18, 2019 in the Korean Intellectual Property Office, the entirety of which is incorporated by reference herein.

BACKGROUND

1. Technical Field

The present disclosure relates to a foothold-based profiling method and a terminal using same. More specifically, the present disclosure relates to a method for providing information that may be utilized in footholds and movement between footholds through profiling based on a foothold of a user, and a terminal using same.

2. Description of Related Art

According to a 2018 survey targeted at personal location information providers and location-based service providers, 30.4% of the respondents expect industry growth in areas such as promotional marketing, transportation, the public sector, and safety, but say there are many obstacles due to strong regulations.

The legal definition of location information refers to information concerning a place where a movable object or individual exists or existed at a specific time, collected using various electronic devices. Since personal location information contains sensitive private information of an individual, it is necessary to thoroughly protect person location information. Conversely, since the object location information is less likely to contain sensitive information, it is necessary to relax regulations surrounding the object location information and to support the use thereof in various industries to foster related industries.

Profiling refers to a processing of private information in order to analyze, evaluate, or predict the information of an individual such as job performance, economic situation, health, disposition, interests, behavior, location, or movement of an individual.

As one related art, a method for personalizing a mobile terminal is disclosed in a Patent Registration Publication. According to this related art, the mobile terminal collects a personalization setting list through the mobile terminal personalization server. A personalization setting profile is determined depending on a user of the mobile terminal.

As another related art, a translation device and method using location information and profiling information are disclosed in a Patent Registration Publication. According to this related art, domain information about a place detected using location information and profiling information is translated.

The above related art does not disclose any configuration regarding the profiling. That is, the above related art does not disclose any relationship between location information and profiling information. However, a foothold-based profiling method according to an embodiment of the present disclosure relates to a foothold detection using an event generated in a terminal and location information, and a method for using the detected foothold.

SUMMARY OF THE INVENTION

The present disclosure is directed to addressing the shortcomings associated with some related art in which only a simple collection of location information is disclosed, and the conditions under which the location information is collected are not disclosed.

The present disclosure is further directed to addressing the shortcomings associated with some related art in which a theory of a foothold having high importance and relevance to a user among location information of various places is not disclosed.

The present disclosure is still further directed to addressing an issue regarding personal data protection in some related art in which the generation of a learning model using the data depends on a learning server via a network.

Aspects of the present disclosure are not limited to those mentioned above, and other aspects not mentioned above may be clearly understood by those skilled in the art from the following description. Further, it is to be understood that the aspects and advantages of the present disclosure may be embodied by the means and a combination thereof in claims.

A foothold-based profiling method according to an embodiment of the present disclosure includes: collecting information about an event occurring in a terminal, including at least one of a communication connection, a charging, or a user input; collecting location information of the terminal in response to the occurrence of the event; selecting a foothold based on the location information; and collecting information about the foothold.

In addition, the collecting location information of the terminal may be performed by using at least one of indoor positioning or a global navigation satellite system (GNSS).

In addition, the collecting the location information of the terminal may include verifying GNSS-based location information using at least one of a distance accuracy, a moving distance, or a moving speed.

In addition, the selecting the foothold may include using communication connectivity information of the terminal related to at least one of a wireless LAN, a short-range communication, or a mobile communication network.

In addition, the selecting the foothold may include selecting a charging commencement foothold of the terminal using charging information.

In addition, the selecting the foothold may include selecting a foothold including a restaurant, a cafe, or a store which was visited, using received payment information.

In addition, the selecting the foothold may include selecting, as a foothold, a place where the terminal has stayed for a period of time equal to or greater than a threshold value, based on location information corresponding to the place.

In addition, the selecting the foothold may include determining a home and a workplace from among the footholds using the number of days visited and total time stayed.

In addition, the collecting the information about the foothold may further include collecting commuting route pattern information, wherein the collecting the commuting route pattern information may include: collecting location information for a period of travel time between the home and the workplace; analyzing a commuting route using the location information; searching for the commuting route pattern based on a result of the analysis; and learning the commuting route pattern.

In addition, the collecting the information about the foothold may further include recognizing a commuting instance based on the route pattern information, wherein the recognizing the commuting instance includes: predicting a departure using a departure angle at a departure place with respect to an arrival place at the time of commuting to or from work; monitoring a travel route based on the commuting route pattern; and predicting arrival.

A terminal according to an embodiment of the present disclosure includes: a data collector configured to collect location data of the terminal in response to an occurrence of an event by using data about the event occurring in the terminal, including at least one of a communication connection, a charging, or a user input; a place learner configured to learn places where the event occurs by using the location data; and a processor configured to select a foothold from among the places where the event occurs based on a learning result of the place learner, and collect information about the foothold.

In addition, the terminal may further include a transceiver configured to transmit and receive various communication signals required for indoor positioning, and a position sensor configured to receive a position signal of a global navigation satellite system (GNSS). The processor may be configured to cause the data collector to collect position data for indoor and outdoor positioning by using the transceiver and the position sensor.

In addition, the processor may verify GNSS-based location data by using at least one of a distance accuracy, a moving distance, or a moving speed.

The data collector may include a communication connectivity data producer configured to generate location data of a communication connection foothold to which the terminal is communicatively connected via at least one of a wireless LAN, a short-range communication, or a mobile communication network. The processor may select the communication connection foothold based on the learning result of the place learner performing learning using the location data of the communication connection foothold.

In addition, the data collector may include a battery data producer configured to collect location data of a charging foothold where charging of the terminal is initiated. The processor may select the charging foothold based on the learning result of the place learner performing learning using the location data of the charging foothold.

In addition, the data collector may include a payment data generator configured to generate location data of a payment foothold where the terminal receives the payment data. The processor may select a payment foothold based on the learning result of the place learner performing learning using the location data of the payment foothold.

In addition, the processor may be configured to select a place as a foothold by using the place learner which has performed learning using the location data of the place where the terminal stayed for a period of time greater than or equal to the threshold value.

In addition, the processor may be configured to determine the home and the workplace from among the footholds by using the number of days visited and the total time stayed.

In addition, the terminal may further include a route pattern learner configured to learn a commuting route pattern searched for by using the location data collected for a period of the travel period between the home and the workplace. In addition, the processor may be configured to collect commuting route pattern data by using the route pattern learner.

In addition, the processor may be configured to recognize a commuting instance based on the route pattern data, by using a process of predicting departure using a departure angle at the departure place in regards to the arrival place at the time of commuting to or from work, monitoring a travel route based on the commuting route pattern, and predicting arrival.

According to embodiments of the present disclosure, since location information is collected based on a connectivity related event of the terminal, the efficiency of power management in a mobile device is increased.

In addition, footholds may be determined based on a connectivity related event of the terminal, and profiling information may be collected in regards to movement between the footholds.

In addition, a platform for foothold-based profiling may be built.

BRIEF DESCRIPTION OF DRAWINGS

The foregoing and other aspects, features, and advantages of the invention, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items.

FIG. 1 is a diagram illustrating a network environment to which a terminal according to an embodiment of the present disclosure is connected.

FIG. 2 is a block diagram of a terminal according to an embodiment of the present disclosure.

FIG. 3 is a block diagram of a data collector and a learner according to an embodiment of the present disclosure.

FIG. 4 is a flowchart of a foothold-based profiling method according to an embodiment of the present disclosure.

FIG. 5 is a table showing foothold conditions and collected data according to an embodiment of the present disclosure.

FIG. 6 is a flowchart of a location information verification method according to an embodiment of the present disclosure.

FIG. 7 is a flowchart illustrating a method for determining home and a workplace from among footholds according to an embodiment of the present disclosure.

FIG. 8 is a flowchart of collecting commuting route pattern information according to an embodiment of the present disclosure.

FIG. 9 is a flowchart of S440 in FIG. 8.

FIG. 10 is a flowchart of S460 in FIG. 8.

FIG. 11 is a diagram illustrating a user interface for data collection according to an embodiment of the present disclosure.

FIG. 12 is a diagram illustrating a UI for data collection according to an embodiment of the present disclosure.

FIG. 13 is a flowchart of a commuting recognition method according to an embodiment of the present disclosure.

DETAILED DESCRIPTION

Hereinafter, embodiments of the present disclosure will be described in detail with reference to the accompanying drawings. Like reference numerals refer to the like elements throughout and a duplicate description thereof is omitted. Suffixes "module" and "unit or portion" for elements used in the following description are merely provided for facilitation of preparing this specification, and thus they are not granted a specific meaning or function. In addition, in the following description of the embodiments disclosed in this specification, the detailed description of related known technology will be omitted when it may obscure the subject matter of the embodiments according to the present disclosure. The accompanying drawings are merely used to help easily understand embodiments of the present disclosure, and it should be understood that the technical idea of the present disclosure is not limited by the accompanying drawings, and these embodiments include all changes, equivalents or alternatives within the idea and the technical scope of the present disclosure.

Although the terms first, second, third, and the like may be used herein to describe various elements, components, regions, layers, and/or sections, these elements, components, regions, layers, and/or sections should not be limited by these terms. These terms are generally only used to distinguish one element from another.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present.

As used herein, the terms "information" and "data" in "location information" and "information data," and "information about events" and "data about events," and "foothold information" and "foothold data" may be used interchangeably. For example, with reference to the same object, the term "data" may be used at the process side of the terminal 100, while the term "information" may be used at the user side.

The present disclosure relates to a foothold-based profiling method and a terminal using the same. The foothold-based profiling method includes identifying a movement pattern of a user and building a personal profiling service platform based on a foothold automatically generated using the movement pattern.

FIG. 1 is a diagram illustrating a network environment to which a terminal according to an embodiment of the present disclosure is connected.

Referring to FIG. 1, a network environment 1 according to an embodiment of the present disclosure includes a terminal 100, a server 200, a global navigation satellite system (GNSS) 300 and a network 500 which connects the above components so as to mutually communicate.

The terminal 100 is a device that executes a foothold-based profiling method. The terminal 100 may be implemented in the form of a mobile terminal, for example, a smartphone, which includes a sensor capable of collecting location information, a communication device that may be connected to the network environment 1, and a display showing a user interface (UI).

The server 200 may include a server for each function. The server may include a learning server that trains an artificial intelligence (AI) model, a file server that provides various files associated with the AI model, a database server, a web server, an application server, and a cloud server.

The GNSS 300 is a constellation of satellites providing signals from space that transmit positioning and timing data to GNSS receivers. The GNSS 300 is used not only for military use, such as missile guidance, but also for surveying or navigation systems of aircraft, ship, automobile and the like.

Typical examples of the GNSS are GPS in the US, GLONASS in Russia, Galileo in Europe and COMPASS in China. Among the GNSS, GPS and GLONASS are currently operating normally and actively providing services.

The GPS is a system that provides location, speed, and time measurement services by using GPS satellites orbiting the Earth at an altitude of 20,200 km. The GPS receiver receives signals transmitted from three or more GPS satellites to determine the positions of the satellite and the receiver. The distance between the satellite and the receiver may be calculated using the difference between signal arrival time at a receiver and time of signal transmission by the satellite, wherein the transmitted signal contains position information of the satellite.

Based on the distances to at least three satellites and the position of each satellite, the position of the receiver may be calculated, for example, by triangulation. However, since the time between the three satellites and the receiver is not synchronized accurately, an additional satellite is required to synchronize the time of the receiver with the satellites. Thus, four or more satellites are usually required to determine the location of the receiver.

To maintain the accuracy of the GPS satellites, control and integrity monitor stations installed throughout the world control the accuracy and operation of the GPS satellites. The GPS is available 24 hours anywhere on Earth and is resistant to weather conditions, external interference and interruption. In addition, the GPS has excellent reliability and accuracy of positioning information in that the GPS uses the world geodetic system (WGS) worldwide.

The GPS provides service using 24 satellites arranged in six orbits, and signals from the satellites are transmitted using two carrier waves L1 (1575.42 MHz) and L2 (1227.6 MHz). These two frequencies are phase-modulated into irregular codes by C/A code and P code. Navigation information is provided separately for the standard positioning system (SPS) and the precise positioning system (PPS). The SPS is used for civilian purposes for positioning and time transmission and can only use C/A codes of L1 frequency. PPS is mainly designed for military use with functions of positioning, timing, and speed, and uses P(Y) codes of L1 and L2.

The network 500 may be any suitable communication network including wired and wireless networks, such as a local area network (LAN), a wide area network (WAN), the Internet, the Intranet, and the extranet and a mobile network such as cellular, 3G, LTE, 5G, a Wi-Fi network, an AD hoc network, and a combination thereof.

The network 500 may include connection of network elements such as a hub, a bridge, a router, a switch, and a gateway. The network 500 can include one or more connected networks, such as a multi-network environment, including a public network such as the Internet and a private network such as a safe corporate private network. Access to the network 500 can be provided via one or more wired or wireless access networks.

The terminal 100 may transmit and receive data to and from the server 200 via a 5G network. Specifically, the terminal 100 implemented in the form of a smartphone may perform data communication with the server 200 using at least one service of enhanced mobile broadband (eMBB), ultra-reliable and low latency communications (URLLC), or massive machine-type communications (mMTC) via the 5G network.

The eMBB is a mobile broadband service, and provides, for example, multimedia contents and wireless data access. In addition, more improved mobile services such as a hotspot and a wideband coverage for receiving mobile traffic that are tremendously increasing may be provided through eMBB. Through a hotspot, high-volume traffic may be accommodated in an area where user mobility is low and user density is high. A wide and stable wireless environment and user mobility may be secured by a wideband coverage.

The URLLC service defines requirements that are far more stringent than existing LTE in terms of reliability and transmission delay of data transmission and reception, and corresponds to a 5G service for production process automation in the industrial fields, telemedicine, remote surgery, transportation, safety, and the like.

mMTC (massive machine-type communications) is a service that is not sensitive to transmission delay requiring a relatively small amount of data transmission. mMTC enables a much larger number of terminals, such as sensors, than general mobile cellular phones to be simultaneously connected to a wireless access network. In this case, the price of the communication module of a terminal should be low and a technology improved to increase power efficiency and save power is required to enable operation for several years without replacing or recharging a battery.

The smartphone shown in FIG. 1 corresponds to one of the various embodiments of the terminal 100. Hereinafter, the terminal 100 according to an embodiment of the present disclosure will be described with a focus on a smartphone. Without particular assumptions or conditions, the description of the smartphone may also be applied as is to other embodiments of the terminal 100.

The terminal 100 that performs the foothold-based profiling method according to an embodiment of the present disclosure may include a learner. The learner may learn places by using location information. A foothold may be determined from among the places based on a result of the place learning. In addition, the learner may learn the route between the footholds. Based on the result of the route learning, an instance of movement between the footholds may be recognized.

Learning according to an embodiment of the present disclosure is based on a statistical learning theory. The statistical learning theory deals with a problem of finding predictive functions based on data. The goals of learning are understanding and prediction. Learning falls into many categories, including supervised learning, unsupervised learning, online learning, and reinforcement learning. From the perspective of the statistical learning theory, supervised learning is most understood.

The supervised learning involves learning from a training set of data. All trained points are input/output pairs, where inputs are mapped to outputs. The learning includes deducing the function that maps the input to the output, such that the learned function may be used to predict an output from future inputs.

In addition, the terminal 100 may re-train the AI model, which is trained by the learning, using personal data of a user based on a transfer learning method. The terminal 100 may use various AI application programs provided from the server 200 during a process of executing or retraining the AI model.

Two methods may be largely used for deep-learning-based foothold learning and route pattern learning between footholds according to an embodiment of the present disclosure. Of the two methods, one method is to train a deep learning model from the beginning, and the other is to use an already trained deep learning model.

A basic training of a deep learning model, i.e., training of a deep network, requires a process of learning features and completing a model by collecting a massive amount of label-designated training data sets and designing a network architecture. Although an excellent result may be obtained through the training of the deep network, this method requires a massive amount of training data sets, and requires setting a layer and a weight for a used network, such as a deep neural network.

A plurality of deep learning application programs used in a pre-trained deep learning model may use transfer learning method, which is a process including a method of minutely adjusting a pre-trained model. According to this transfer learning method, new data including a class which has not been known in the related art may be injected into a deep network by using an existing network such as AlexNet or GoogLeNet.

By using this transfer learning method, time consumption may be reduced and a result may be quickly calculated owing to a model being pre-trained with connection-based big data.

The machine-learning-based foothold learning and route pattern learning between the footholds may include a process of manually extracting features and classifying the extracted features. For example, a HOG feature extraction method using a support vector machine (SVM) learning algorithm may be used as an embodiment of the present disclosure. As other feature extraction algorithms, Harris corner, Shi & Tomasi, SIFT-DoG, FAST, AGAST, and main invariant feature quantities (SURF, BRIEF, ORB) methods may be used.

FIG. 2 is a block diagram of a terminal according to an embodiment of the present disclosure.

The terminal 100 may be implemented as a stationary terminal and a mobile terminal, such as a mobile phone, a projector, a smartphone, a laptop computer, a terminal for digital broadcast, a personal digital assistant (PDA), a portable multimedia player (PMP), a navigation system, a slate PC, a tablet PC, an ultrabook, a wearable device (for example, a smartwatch, a smart glass, and a head mounted display (HMD)), a set-top box (STB), a digital multimedia broadcast (DMB) receiver, a radio, a laundry machine, a refrigerator, a desktop computer, a digital signage.

That is, the terminal 100 may be implemented as various home appliances used at home and also applied to a fixed or mobile robot.

The terminal 100 may perform a function of a voice agent. The voice agent may be a program which recognizes speech of the user and outputs, as speech, a response appropriate for the recognized speech of the user.

Referring to FIG. 2, the terminal 100 may include a wireless transceiver 110, an input interface 120, a learning processor 130, a sensor 140, an output interface 150, an interface 160, a memory 170, a processor 180, and a power supply 190.

A trained model may be loaded in the terminal 100.

In the meantime, the learning model may be implemented by hardware, software, or a combination of hardware and software. When a part or all of the learning model is implemented by software, one or more commands which configure the learning model may be stored in the memory 170.

The wireless transceiver 110 may include at least one of a broadcast receiver 111, a wireless communication module 112, a wireless internet module 113, a short-range transceiver 114, or a location information module 115.

The broadcast receiver 111 receives a broadcasting signal and/or broadcasting related information from an external broadcasting management server through a broadcasting channel.

The wireless communication module 112 may transmit/receive a wireless signal to/from at least one of a base station, an external terminal, or a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless internet module 113 refers to a module configured for wireless internet access and may be built in or external to the terminal 100. The wireless internet module 113 may be configured to transmit/receive a wireless signal in a communication network according to wireless internet technologies.

The wireless internet technologies may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A).

The short-range transceiver 114 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, or Wireless Universal Serial Bus (USB) technologies.

The location information module 115 is a module for obtaining the location (or the current location) of a mobile terminal, and its representative examples include a global positioning system (GPS) module or a Wi-Fi module. For example, by using the GPS module, the mobile terminal may obtain its position by using a signal transmitted from a GPS satellite.

The input interface 120 may include a camera 121 configured to acquire image signal, a microphone 122 configured to acquire an audio signal, and a user input interface 123 configured to receive information inputted from a user.

Speech data or image data collected by the input interface 120 is analyzed to be processed as a control command of the user.

The input interface 120 may obtain training data for training a model and input data used to obtain an output using the trained model.

The input interface 120 may obtain input data which is not processed, and, in this case, the processor 180 or the learning processor 130 pre-processes the obtained data to generate training data capable of being inputted or pre-processed input data for the model learning.

Here, the preprocessing of input data may refer to extracting an input feature from the input data.

The input interface 120 is intended to receive image information (or signal), audio information (or signal), data, or information inputted from the user. In order to receive the image information, the terminal 100 may include one or a plurality of cameras 121.

The camera 121 processes an image frame such as a still image or a moving image obtained by an image sensor in a video call mode or a photographing mode. The processed image frame may be displayed on the display 151 or stored in the memory 170.

The microphone 122 processes an external sound signal into electrical speech data. The processed speech data may be utilized in various forms in accordance with a function which is being performed by the terminal 100 (or an application program which is being executed). In the microphone 122, various noise removal algorithms which remove noise generated during the process of receiving the external sound signal may be implemented.

The user input interface 123 is intended to receive information from the user. In response to the information being inputted through the user input interface 123, the processor 180 may control the operation of the terminal 100 so as to correspond to the input information.

The user input interface 123 may include a mechanical input interface (or a mechanical key, for example, a button located on a front, rear, or side surface of the terminal 100, a dome switch, a jog wheel, or a jog switch) and a touch type input interface. For example, the touch type input interface may be formed by a virtual key, a soft key, or a visual key which is disposed on the touch screen through a software process, or a touch key which is disposed on a portion other than the touch screen.

The learning processor 130 learns the model configured by an artificial neural network using the training data.

Specifically, the learning processor 130 repeatedly trains the artificial neural network by using the aforementioned various learning techniques to determine optimized model parameters of the artificial neural network.

In this specification, the artificial neural network which is trained using training data to determine parameters may be referred to as a learning model or a trained model.

In this case, the learning model may be used to deduce a result for the new input data, rather than the training data.

The learning processor 130 may be configured to receive, classify, store, and output information to be used for data mining, data analysis, intelligent decision making, and machine learning algorithm and techniques.

The learning processor 130 may include one or more memories configured to store data which is received, detected, sensed, generated, previously defined, or outputted by another component, device, the terminal, or a device which communicates with the terminal.

The learning processor 130 may include a memory which is combined with or implemented in the terminal. In some embodiments, the learning processor 130 may be implemented using the storage 170.

Selectively or additionally, the learning processor 130 may be implemented using a memory related to the terminal, such as an external memory which is directly coupled to the terminal or a memory maintained in the server which communicates with the terminal.

According to another embodiment, the learning processor 130 may be implemented using a memory maintained in a cloud computing environment or other remote memory locations accessible to the terminal via a communication method such as a network.

The learning processor 130 may be configured to store data in one or more databases to identify, index, categorize, manipulate, store, search, and output data in order to be used for supervised or non-supervised learning, data mining, predictive analysis, or used in the other machine. Here, the database may be implemented using the memory 170, a memory of the learning device, a memory maintained in a cloud computing environment or other remote memory locations accessible to the terminal via a communication method such as a network.

Information stored in the learning processor 130 may be used by the processor 180 or one or more controllers of the terminal using one of different types of data analysis algorithms and machine learning algorithms.

Examples of such an algorithm may include a k-nearest neighbor system, fuzzy logic (for example, possibility theory), a neural network, a Boltzmann machine, vector quantization, a pulse neural network, a support vector machine, a maximum margin classifier, hill climbing, an inductive logic system, a Bayesian network, (for example, a finite state machine, a Mealy machine, a Moore finite state machine), a classifier tree (for example, a perceptron tree, a support vector tree, a Markov Tree, a decision tree forest, an arbitrary forest), a reading model and system, artificial fusion, sensor fusion, image fusion, reinforcement learning, augmented reality, pattern recognition, automated planning, and the like.

The processor 180 may determine or predict at least one executable operation of the terminal based on information which is determined or generated using the data analysis and the machine learning algorithm. To this end, the processor 180 may request, search, receive, or utilize the data of the learning processor 130 and cause the terminal to execute a predicted operation or a desired operation among the at least one executable operation.

The processor 180 may perform various functions which implement intelligent emulation (that is, a knowledge based system, an inference system, and a knowledge acquisition system). This may be applied to various types of systems (for example, a fuzzy logic system) including an adaptive system, a machine learning system, and an artificial neural network.

The processor 180 may include sub modules which enable operations involving voice and natural language voice processing, such as an I/O processing module, an environmental condition module, a speech to text (STT) processing module, a natural language processing module, a workflow processing module, and a service processing module.

The sub modules may have an access to one or more systems or data and a model, or a subset or a super set thereof in the terminal. Further, each of the sub modules may provide various functions including a glossarial index, user data, a workflow model, a service model, and an automatic speech recognition (ASR) system.

According to another embodiment, another aspect of the processor 180 or the terminal may be implemented by the above-described sub module, a system, data, and a model.

In some embodiments, based on the data of the learning processor 130, the processor 180 may be configured to detect and sense requirements based on contextual conditions expressed by user input or natural language input or user's intention.

The processor 180 may actively derive and obtain information required to completely determine the requirement based on the contextual conditions or the user's intention. For example, the processor 180 may actively derive information required to determine the requirements, by analyzing past data including historical input and output, pattern matching, unambiguous words, and input intention.

The processor 180 may determine a task flow to execute a function responsive to the requirements based on the contextual condition or the user's intention.

The processor 180 may be configured to collect, sense, extract, detect and/or receive a signal or data which is used for data analysis and a machine learning task through one or more sensing components in the terminal, to collect information for processing and storing in the learning processor 130.

The information collection may include sensing information by a sensor, extracting information stored in the memory 170, or receiving information from other terminal, an entity, or an external storage device through a transceiver.

The processor 180 collects usage history information from the terminal and stores the information in the memory 170.

The processor 180 may determine best matching to execute a specific function by using the stored usage history information and predictive modeling.

The processor 180 may receive or sense surrounding environment information or other information through the sensor 140.

The processor 180 may receive a broadcasting signal and/or broadcasting related information, a wireless signal, or wireless data through the wireless transceiver 110.

The processor 180 may receive image information (or a corresponding signal), audio information (or a corresponding signal), data, or user input information from the input interface 120.

The processor 180 may collect the information in real time, process or classify the information (for example, a knowledge graph, a command policy, a personalized database, or a conversation engine) and store the processed information in the memory 170 or the learning processor 130.

In response to the operation of the terminal being determined based on data analysis and a machine learning algorithm and technology, the processor 180 may cause the components of the terminal to execute the determined operation. Further, the processor 180 may cause the terminal to perform the determined operation in accordance with the control command.

In response to a specific operation being performed, the processor 180 analyzes history information indicating execution of the specific operation through the data analysis and the machine learning algorithm and technology and updates the information which is previously learned based on the analyzed information.

Therefore, the processor 180 may improve precision of a future performance of the data analysis and the machine learning algorithm and technique based on the updated information, together with the learning processor 130.

The sensor 140 may include one or more sensors which sense at least one of information in the mobile terminal, surrounding environment information around the mobile terminal, or user information.

For example, the sensor 140 may include at least one of a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, a camera 121), a microphone 122, a battery gauge, an environment sensor (for example, a barometer, a hygrometer, a thermometer, a radiation sensor, a thermal sensor, or a gas sensor), or a chemical sensor (for example, an electronic nose, a healthcare sensor, or a biometric sensor). Further, the terminal 100 disclosed in the present disclosure may combine various kinds of information sensed by at least two of the above-mentioned sensors and may use the combined information.

The output interface 150 is intended to generate an output related to a visual, aural, or tactile stimulus and may include at least one of a display 151, an sound output interface 152, a haptic module 153, or an optical output interface 154.

The display 151 displays (outputs) information processed in the terminal 100. For example, the display 151 may display execution screen information of an application program driven in the terminal 100 and user interface (UI) and graphic user interface (GUI) information in accordance with the execution screen information.

The display 151 forms a mutual layered structure with a touch sensor or is formed integrally to be implemented as a touch screen. The touch screen may simultaneously serve as a user input interface 123 which provides an input interface between the terminal 100 and the user and provide an output interface between the terminal 100 and the user.

The sound output interface 152 may output audio data received from the wireless transceiver 110 or stored in the memory 170 in a call signal reception mode, a phone-call mode, a recording mode, a speech recognition mode, or a broadcasting reception mode.

The sound output interface 152 may include at least one of a receiver, a speaker, or a buzzer.

The haptic module 153 may generate various tactile effects that the user may feel. A representative example of the tactile effect generated by the haptic module 153 may be vibration.

The optical output interface 154 outputs a signal for notifying occurrence of an event using light of a light source of the terminal 100. Examples of the event generated in the terminal 100 may be message reception, call signal reception, missed call, alarm, schedule notification, email reception, and information reception through an application.

The interface 160 serves as a passage with various types of external devices which are connected to the terminal 100. The interface 160 may include at least one of a wired/wireless headset port, an external charger port, a wired/wireless data port, a memory card port, a port which connects a device equipped with an identification module, an audio input/output (I/O) port, a video input/output (I/O) port, or an earphone port. The terminal 100 may appropriately control the connected external device in accordance with the connection of the external device to the interface 160.

In the meantime, the identification module is a chip in which various information for authenticating a usage right of the terminal 100 is stored. The identification module may include a user identification module (UIM), a subscriber identify module (SIM), and a universal subscriber identity module (USIM). The device with an identification module (hereinafter, "identification device") may be manufactured as a smart card. Therefore, the identification device may be connected to the terminal 100 through the interface 160.

The memory 170 stores data which supports various functions of the terminal 100.

The memory 170 may store various application programs (or applications) driven in the terminal 100, data for the operation of the terminal 100, commands, and data (for example, at least one algorithm information for machine learning) for the operation of the learning processor 130.

The memory 170 may store the model which is learned in the learning processor 130 or the learning device.

If necessary, the memory 170 may store the trained model by dividing the trained model into a plurality of versions depending on a training timing or a training progress.

In this case, the memory 170 may store input data obtained from the input interface 120, learning data (or training data) used for model learning, a learning history of the model, and so forth.

In this case, the input data stored in the memory 170 may be not only data which is processed to be suitable for the model learning, but also input data itself which is not processed.

In addition to the operation related to the application program, the processor 180 may generally control an overall operation of the terminal 100. The processor 180 may process a signal, data, or information which is inputted or outputted through the above-described components or drive the application programs stored in the memory 170 to provide or process appropriate information or functions to the user.

Further, in order to drive the application program stored in the memory 170, the processor 180 may control at least some of components described with reference to FIG. 1. Moreover, the processor 180 may combine and operate at least two of components included in the terminal 100 to drive the application program.

As described above, the processor 180 may control an operation related to the application program and an overall operation of the terminal 100. For example, when the state of the terminal satisfies a predetermined condition, the processor 180 may execute or release a locking state which restricts an input of a control command of a user for the applications.

The power supply 190 receives application of external power or internal power, and supplies the power to the components included in the user equipment 100, under the control of the processor 180. The power supply 190 includes a battery, and the battery may be an embedded battery or a replaceable battery.

The terminal 100 may further include a data collector 10 and a learner 20. The data collector 10 collects location data of the terminal 100 in response to the occurrence of an event in the terminal 100. The learner 20 may learn places by using location data, and learn route patterns between footholds from among the places. Hereinafter, the data collector 10 and the learner will be described in detail.

FIG. 3 is a block diagram of a data collector and a learner according to an embodiment of the present disclosure.

Referring to FIG. 3, a block diagram of the data collector 10 and the learner 20 is shown. As shown in FIG. 2, the data collector 10 and the learner 20 are implemented in the form of hardware, such as an application specific integrated circuit (ASIC) or field programmable gate array, separate from the memory 170. Alternatively, as shown in FIG. 3, the data collector 10 and the learner 20 may be implemented in the form of software loaded on the memory 170.

Various computer program modules may be loaded on the memory 170. The computer programs mounted in the memory 170 may include the data collector 10 and the learner 20 as an application program, in addition to an operating system and a system program configured to manage hardware.

The data collector 10 may include a communication connectivity data generator 11 configured to generate location data, a battery data generator 12, a payment data generator 13, a behavior recognition data generator 14, a data logger 16 configured to preserve raw data 18 collected from the sensor, a data supplier 17 configured to provide various types of data to the learner 20, the collected raw data 18, and a data controller 15 configured to control the flow of data among the components of the data collector 10.

In a foothold-based profiling method according to an embodiment of the present disclosure, activity recognition technology may be used. The activity recognition technology may be referred to as human activity recognition (HAR). The HAR refers to technology that recognizes behavior by collecting and interpreting information related to motion or gesture of a person using various sensors. User activity is important information for effective communication with other people, and provides essential information for communication between people and technology, especially in the fields of human-computer interaction (HCI) and human-robot interaction (HRI).

The activity recognition data generator 14 generates activity recognition (AR) data using signals collected by the sensor 140 included in the terminal 100. AR data according to an embodiment of the present disclosure may be used for determining a moving state of the user, such as idling, walking, running, or driving, for estimating a moving means for each foothold, and for adjusting a location information tracking interval.

The learner 20 may include a place learner 21 configured to learn places where an event occurs using location data collected at the places where the event occurs, a route pattern learner 22 configured to learn a route between footholds using location data of a foothold from among the places, an API provider 23 configured to supply, for learning, statistical algorithms and AI algorithms, such as a framework for deep neural network models, and processed data, such as context data 24 and profile data 25.

Since the arrows between the components shown in FIG. 3 schematically represent the direction of the control signal and the data flow, the direction of the actual control signal and the data flow is not limited to the direction of the arrow shown.

The terminal 100 and the processor 180 according to an embodiment of the present disclosure correspond to subjects performing the profiling method S100. That is, the processor 180 included in the terminal 100 may execute the profiling method S100 by controlling various components included in the terminal 100.

FIG. 4 is a flowchart of a foothold based profiling method according to an embodiment of the present disclosure.

A connectivity or connection oriented service is a service in which, between two entities, one or more messages are held in a connected state and data can be exchanged. A feature of connection oriented service is that a logical connection should be established between a sender and a receiver before communication is initiated.

Connectivity according to an embodiment of the present disclosure includes a state in which the terminal 100 can exchange data with the outside, and may include a wireless or wired connection between the terminal 100 and a charging source.

The connectivity may further include connectivity between the terminal 100 and the user. The connectivity between the terminal 100 and the user means that the user collects information through the display 151 of the terminal 100. To activate the display 151 of the terminal 100, the user may provide a user input to the terminal 100. For example, the user input may include pressing an activation button of the display 151, inputting an additional password into the password input window of the locked terminal 100, or inputting a touch pattern.

Information or data about an event related to connectivity between the terminal 100 and the user may be referred to as user present data.

In step S110, the terminal 100 may collect information about the connectivity related event. The foothold according to an embodiment of the present disclosure may be selected from among places where the event occurred. Hereinafter, conditions of the foothold and the collection data that may be information about the event will be described.

FIG. 5 is a table showing foothold conditions and collected data according to one embodiment of the present disclosure.

Referring to FIG. 5, a connectivity type, condition, and collection data of a terminal 100 according to an embodiment of the present disclosure is shown. In the terminal 100, an event may occur by connectivity such as a short-range communication, a wireless LAN, a text message, a mobile communication, a battery, and staying put.

The terminal 100 may be connected to an expansion device via the short-range communication. The short-range communication may include RFID, NFC, Bluetooth (BT), beacon, Zigbee. Referring to FIG. 5, conditions and collected data regarding BT are shown to represent the short-range communication.

The terminal 100 may be connected to the network 500 via the wireless LAN. Wireless LAN technology is based on the IEEE 802.11 standard and is known under the marketing name, wireless fidelity (Wi-Fi). Referring to FIG. 5, conditions and collected data regarding Wi-Fi are shown.

The terminal 100 may receive a text message including payment information via a short message service (SMS) of a mobile network operator to which the terminal 100 is subscribed. That is, in response to the user of the terminal 100 paying with a credit card at a place where payment may occur, such as a cafe, restaurant, or store, the terminal 100 may receive payment information of a corresponding transaction via the SMS. Therefore, the place where the text message including the payment information is received may be a foothold. Referring to FIG. 5, conditions and collected data regarding Wi-Fi are shown.

The terminal 100 receives information about base stations of the mobile network operator to which the terminal 100 is subscribed, and attempts to access the network via a desired base station among the base stations. Wherein, the operation of the terminal 100 to receive wireless access information of the base station is referred to as cell search. One base station has a service coverage area for wireless communication, called a cell. Accordingly, a cell searched by the terminal 100 may be a foothold, and the terminal 100 may identify the movement between the footholds through the change in a cell ID. Referring to FIG. 5, conditions and collected data regarding the cell ID are shown.

The battery of the terminal 100 may be charged with a wired or wireless charging device. For example, in order to be charged, the terminal 100 may receive power via a charging terminal of a USB connector, or may receive power from a transmission coil via a receiving coil. That is, in one embodiment of the present disclosure, the concept of connectivity may be extended to a wired or wireless connection for charging. Referring to FIG. 5, conditions and collected data regarding a battery are shown.

Among the connectivity related events, the terminal 100 may receive location information values while staying in a certain area for a predetermined time. That is, if the connectivity between the terminal 100 and the GNSS, for example, GPS satellites, is maintained in a certain area for a predetermined time, the stay itself may be an event of the terminal 100 related to the connectivity. Referring to FIG. 5, conditions and collected data regarding stay are shown.

As shown, in response to a connectivity related event of the types shown in FIG. 5 occurring in the terminal 100, the terminal 100 collects information about the corresponding event and stores the information in the form of data. In step S120, the terminal 100 may collect location information of the terminal 100 in response to the occurrence of the event. Referring back to FIG. 3, in response to the occurrence of the corresponding event, the location information of the terminal 100 may be collected by at least one of the communication connectivity data generator 11, the battery data generator 12, or the payment data generator 13.

In searching for the current location of the terminal 100 using the location information received by the location information module 115, the terminal 100 may not be able to search for the exact current location due to GPS error. In order to solve such a GPS error, a location information verification method may be used in an embodiment of the present disclosure.

FIG. 6 is a flowchart of a location information verification method according to an embodiment of the present disclosure.

Referring to FIG. 6, a logic for correcting a GPS error, such as GPS location jumping is shown. The GPS location jumping is a phenomenon in which the position of the terminal 100 is recognized as a point away from the current position due to the change of the base station in communicating with the terminal 100 while the terminal 100 stays at one place or moves slowly. In response to the terminal 100 recognizing the current location as an abnormal location, the corresponding data may be filtered using the previous recording location, the current location, and the value of the current AR state, such as, staying still, walking, bicycle movement, and vehicle movement.

In step S210, first, the terminal 100 may collect location information about the current location, including latitude, longitude, and accuracy radius, via GNSS, for example, GPS.

In step S220, the processor 180 may verify the location information using the accuracy radius. For example, the location information may be seen as reliable when based on the accuracy radius being smaller than the reference value of 2 km. The smaller the accuracy radius, the higher the reliability of the location information. The accuracy of GPS location data may be affected by the atmosphere, visibility, and multipath error. Considering the GPS minimum error range of several hundred meters, the aforementioned influence factor and sufficient margin, 2 km may be set as the reference value.

In step S230, the processor 180 may verify the moving distance by using the AR data collected via the AR data generator 14. For example, the corresponding location information may be reliable based on the AR state being still and the moving distance being smaller than the reference value of, for example, 20 m.

In step S240, the processor 180 may verify the moving speed of the terminal 100 by using the AR data. For example, the location information may be reliable in a case in which the moving speed is smaller than the current AR reference value. Referring again to FIG. 6, an example of an AR reference value is shown. The AR reference values are 200 for vehicle movement, 40 for bicycle movement, 4 for walking, 2 for being still, 6 for walking, and 30 for running, where the unit of each reference value is km/h.

In any one of steps S220, S230, and S240 which respectively verify the accuracy radius, the moving distance, and the moving speed constituting the position information, the position information may be invalid based on the verification result of "Yes". The processor 180 of the terminal 100 may repeatedly perform steps S210 to S240 to obtain location information having a value smaller than the reference value for each step.

In step S130, the terminal 100 may select a foothold based on the information about the event and the location information.

In more detail, the place learner 21 learns whether a place may be a foothold using location information of the corresponding place where the event occurs. Here, the place learner 21 learning the position information uses a statistical analysis method of repeatedly collected position information about the same place. Alternatively, an AI algorithm, such as a deep neural network model, may be used in learning. The deep neural network model may recognize the place as a foothold by using the repeatedly collected location information about the same place.

Specifically, in response to the wireless Internet module 113 searching for an AP of Wi-Fi and the terminal 100 being connected to the network 500 by using the searched AP, the communication connectivity data generator 11 may collect location data of a place where the event of the terminal 100 occurs, by using a location information module, such as a GPS module. The terminal 100 repeatedly collects location data of a place where an event occurs for a certain period of time, for example, for two weeks, and the location learner 21 uses the collected location data to learn whether the corresponding place may be a foothold.

Among the footholds on which the life of a user is based, a home and a workplace may be footholds most commonly detected. Hereinafter, according to an embodiment of the present disclosure, a method for determining the home and the workplace from among various footholds will be described.

FIG. 7 is a flowchart illustrating a method for determining a home and a workplace from among footholds according to an embodiment of the present disclosure.

Referring to FIG. 7, a logic of the method S300 for determining the home and the workplace is shown. The processor 180 may perform the method S300 for determining the home and the workplace by using the learning result of the place learner 22.

In step S310, the processor 180 reads stored foothold information. The foothold information may include visit date, visit time, and location information related to a place selected as a foothold based on the occurrence of the event. The processor 180 may read foothold information from the raw data 18 collected by the data collector 10.

Footholds associated with the occurrence of the event may be distinguished from each other by the number of days visited, time stayed, and the number of visits. Thus, the home and the workplace may also be distinguished from other footholds by using the number of days visited, time stayed, and the number of visits.

In step S320, the processor 180 may narrow the range of the footholds to distinguish the home from the workplace by using the number of days that the terminal 100 visited the foothold. For example, in the collected location data of footholds, a foothold that has been visited for three days or more may be a candidate for a home or a workplace. In this case, in order to increase the accuracy, a foothold that has been visited for three days or more out of seven days may be a candidate.

In step S330, the processor 180 may narrow the range of the footholds to distinguish the home from the workplace by using the time the terminal 100 stays in the footholds. For example, a foothold may be a candidate for a home or a workplace based on time stayed for the reference period of 12 hours or more. Here, a foothold at which the user stayed for 12 hours or more, in other words, 4 hours per day for at least 3 days, was selected as a candidate, in consideration of the minimum time for candidates that may be the home or the workplace.

In step S340, the processor 180 may sort, in descending order of visiting frequency, the footholds satisfying the requirements for the number of days that the foothold was visited and time stayed at the foothold.

In step S350, the processor 180 may infer the highest-ranked foothold in the descending order to be the home. Experiments show that the visiting frequency of the home is higher than that of the workplace.

In step S360, the processor 180 reads the remaining foothold information except for the home. Here, the foothold information may include information about the second-highest ranked foothold in the descending order.

In step S370, the processor 180 may verify whether the inferred footholds are the workplace by using the distance between the workplace and the home. For example, the home address and the workplace address of the user may be used to verify the distance between the home and the workplace. That is, the distance between the workplace and the home may be verified by comparing the distance between the home and the workplace calculated on the electronic map based on the addresses, and the distance between the home and the workplace collected from the foothold information.

In step S380, the processor 180 may infer, as the workplace, a foothold with the next highest visiting frequency after the home based on remaining foothold information other than the home.

As described above, the processor 180 of the terminal 100 may determine the home or the workplace from among the footholds by using the learning result of the place learner 21. In addition, the nature of the foothold may be inferred by using an algorithm for determining various footholds. For example, footholds near the home or the workplace may be inferred to be, for example, a restaurant, cafe, or shop, based on distance from the home or the workplace, the number of days visited, time stayed, and the number of visits.

In step S140, when the nature of the foothold is recognized, the terminal 100 may collect information related to the foothold. In particular, in step 141, the terminal 100 may collect commuting route pattern information based on the determination of the home and the workplace. Hereinafter, a method for collecting commuting route pattern information will be described.

FIG. 8 is a flowchart of collecting commuting route pattern information according to an embodiment of the present disclosure.

Referring to FIG. 8, the terminal 100 and the processor 180 may perform a method S400 for collecting commuting route pattern information by using the context learner 22.

In step S410, the processor 180 may collect foothold data for a predetermined period of time, for example, for the past two weeks. To increase reliability, the period of time for data collection was set to two weeks instead of one week. The foothold data may include visit date, visit time, and location data for a place selected as a foothold based on an occurrence of the event. The processor 180 may collect foothold data by using the data collector 10.

In step S420, the processor 180 may determine a home and a workplace from among the footholds, and check travel time period for commuting to or from work. In order to determine the home and the workplace, a method S300 for determining the home and the workplace according to an embodiment of the present disclosure may be used. The travel time period for commuting to or from work may be calculated based on location information collected and accumulated at the home and the workplace. Since the collected location information includes time information, the travel time period for commuting to or from work, that is, average departure times and average arrival times for commuting to or from work, may be calculated using time period information included in location information collected at the home and at the workplace. Here, time out of the reference range due to early work commuting or overtime work may be omitted from the calculation of the average time.

In step S430, the processor 180 may acquire location data of the travel time period between the home and the workplace by using a location information module 115. For example, the processor 180 may acquire raw GPS data corresponding to a location on the commuting route by using a GPS sensor.

In step S440, the processor 180 may analyze the commuting route by using the location data acquired at the location on the commuting route. The analysis of the commuting route may include detailed processes.

FIG. 9 is a flowchart illustrating S440 of FIG. 8 in detail.

Referring to FIG. 9, S440 may include calculating an average travel distance of commuting routes S441, selecting a route having a travel distance of the minimum deviation S442, using data of the selected route S443, and setting an upper limit of the travel distance S444.

The commuting route may include a plurality of routes. The processor 180 may calculate travel distance along each route, and determine an average value and a minimum value. Here, data of a route (route A) corresponding to a travel distance having a minimum deviation value may be used as optimal data for section learning. In response to 60% of the commuting route from the home to the workplace or from the workplace to the home being recognized, the collection of foothold data for the remaining 40% sections may be omitted.

In addition, in the analysis of the commuting route, a route of 180% or more of the travel distance along route A may be omitted from the analysis of the commuting route. 180% is the value determined by the experiment. According to the distribution of the travel distance along the commuting route, 180% or more of route A was most likely not the commuting route.

In step S450, the processor 180 may search a commuting route pattern of the routes for commuting to or from work by using an analysis result of the commuting route. Several rules may apply to the search for the commuting route pattern. The first rule is to set, as a first candidate, a route generated by connecting the points where a large amount of raw data is collected, for example, the points through which the user passed for at least two days during a predetermined period of time. The second rule is to set, as a second candidate, the route having the highest match rate with the first candidate from among the individual routes. The third rule is to set, as the third candidate, a travel route for each day.

In step S460, the processor 180 may learn the commuting route for each section.

FIG. 10 is a flowchart illustrating S460 of FIG. 8 in detail.

Referring to FIG. 10, S460 may include setting a section type according to a route characteristic S461, dividing a route for each section type S462, and learning a section for each section type S463.

For example, the section type may be set depending on the route characteristic. A route with travel time less than 9 minutes, or travel distance less than 1 km may be set as a whole section.

A route with a travel time of 75 minutes or more, or a travel distance of 30 km or more may be set as a distance base section. In addition, a time base section may be set as an intermediate section.

The section division method for calculating the commuting recognition probability for each section type is as follows. The route included in the whole section may be treated as a single section. The route included in the distance base section may be divided into sections of 4 km. The route included in the time base section may be divided into sections of 15 minutes. In other words, the whole section corresponding to the short distance may be recognized as one section; in the time base section corresponding to the medium distance, the section may be set in units of time; and in the distance base section corresponding to the long distance, the section may be set in units of distance.

In step S463, by using the above-described method, the context learner 22 may learn a commuting route pattern based on the section type for each route. Thereafter, in step S470, the processor 180 may further collect newly accumulated foothold data. Further collected foothold data is processed in the next step S420.

FIG. 11 is a diagram illustrating a UI for data collection according to an embodiment of the present disclosure.

Referring to FIG. 11, a UI showing collected data and maps according to a journey profile is illustrated. The menu of the journey profile may include a day route item, foothold (my place) item, a commute item, and a summary item. FIG. 11 shows a map of the day route and information about the collected data. The straight line on the map represents the commuting route between the home and the workplace. In addition, points where the location data was collected and footholds appear on the route. The location data mainly corresponds to user present data, that is, location data collected according to a terminal 100 operation event by the user. Each collected data is marked with a serial number, time information, accuracy and data type.

FIG. 12 is a diagram illustrating a UI for data collection according to an embodiment of the present disclosure.

Referring to FIG. 12, a map regarding foothold (my place) and foothold information is shown. Foothold information includes the number of days that the foothold was visited, time stayed at the foothold, the number of visits, foothold type, and foothold name.

The journey profile may be installed in the terminal 100 in the form of an application. The processor 180 may collect information about a connectivity related event and location information of the terminal 100 by controlling the journey profile loaded on the memory 170, and select a foothold based on the location information.

In step S142, the processor 180 may recognize a commuting instance of a user by using the collected commuting route pattern information. According to the related art, the terminal 100 may recognize a home or a workplace as a destination via user input. The terminal 100 may recommend a searched route to the user regardless of personal data by using an algorithm of the navigation application. Hereinafter, a commuting instance recognition method S500 according to an embodiment of the present disclosure will be described.

FIG. 13 is a flowchart of a commuting instance recognition method according to an embodiment of the present disclosure.

Referring to FIG. 13, a logic of the commuting instance recognition method is shown. The terminal 100 may recognize the commuting instance of the user by using the collected commuting route pattern information and provide the user with information required for the commuting instance without user input.

In step S501, it is assumed that the terminal 100 has arrived at the home or workplace foothold.

In step S502, the terminal 100 starts monitoring to detect the departure state from the home or workplace foothold. The processor 180 may execute logic to monitor the departure state in the background state.

The processor 180 determines a departure condition from the home or workplace foothold. In step 503, for example, in response to the terminal 100 starting to deviate from the 300 m radius from the home or the workplace, the processor 180 may recognize that the terminal 100 has departed.

In step S504, the processor 180 determines whether the starting angle is within 70 degrees by comparing the first and second coordinates of the route pattern with the current position. The starting angle is measured based on the current location information based on how far the current position of the terminal 100 is from the learned commuting route. In step S505, the processor 180 may determine whether the departure angle is 70 degrees or less by using location information about the departure place and location information collected after the departure. The departure angle may be measured at a certain point in time, for example, 10 minutes, after departure. According to an experiment, the starting angle of 90 degrees or more in an experimental area with a lot of lattice-shaped roads indicates that there is a high probability that the terminal 100 has left the commuting route. However, in order to increase the reliability, the reference value of the starting angle was set to 70 degrees.

In step S506, in response to the departure angle being 70 degrees or less, the processor 180 of the terminal 100 starts monitoring the commuting route.

In step S512, the departure angle greater than 70 degrees may be recognized as travel or leisure activities rather than commuting to or from work. As a result, the route monitoring ends.

In step S507, after the start of monitoring, the terminal 100 may determine whether the terminal 100 itself is located in the route pattern.

In response to the terminal 100 being not located in the route pattern, the route monitoring ends. In step S508, in response to the terminal 100 being located in the route pattern, the terminal 100 may determine whether the terminal 100 itself stays in the same section for at least 8 minutes.

In response to the terminal 100 staying in the same section for at least 8 minutes, the route monitoring ends. In step S509, in response to the terminal 100 staying in the same section for less than 8 minutes, the probability for each section type being a commuting route may be calculated. According to an experiment, the reliability of the experimental data was the highest when the time criteria for staying in the same section was 8 minutes in consideration of, for example, rush hour, and standard signal waiting time.

In step S511, in response to the probability being 80% or more, it may be determined whether the terminal 100 has reached the destination. According to the result of S511, the terminal 100 may process S507 or terminate the route monitoring.

In step S507, in response to the probability being less than 80%, the terminal 100 determines whether the terminal 100 itself is located in the route pattern. According to the result of S507, the terminal 100 may process S508 or terminate the route monitoring.

As such, according to embodiments of the present disclosure, since location information is collected based on a connectivity related event of the terminal, the efficiency of power management in a mobile device is increased.

In addition, footholds may be determined based on a connectivity related event of the terminal, and profiling information may be collected in movement between the footholds.

In addition, a platform for foothold based profiling may be built.

The embodiments described above may be implemented through computer programs executable through various components on a computer, and such computer programs may be recorded in computer-readable media. In this case, examples of the computer-readable media may include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program instructions, such as ROM, RAM, and flash memory devices.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

The singular forms "a," "an" and "the" in this present disclosure, in particular, claims, may be intended to include the plural forms as well. In addition, the description of a range may include individual values falling within the range (unless otherwise specified), and is the same as describing the individual values forming the range.

The order of individual steps in process claims according to the present disclosure does not imply that the steps must be performed in this order; rather, the steps may be performed in any suitable order, unless expressly indicated otherwise. The present disclosure is not necessarily limited to the order of the steps given in the description. All examples described herein or the terms indicative thereof ("for example," etc.) used herein are merely to describe the present disclosure in greater detail. Therefore, it should be understood that the scope of the present disclosure is not limited to the exemplary embodiments described above or by the use of such terms unless limited by the appended claims. Also, it should be apparent to those skilled in the art that various modifications, combinations, and alternations may be made depending on design conditions and factors within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A foothold based profiling method, comprising:
   collecting information about an event occurring in a terminal, comprising at least one of a communication connection, a charging, or a user input;
   collecting location information of the terminal in response to an occurrence of the event;
   determining a foothold specific to a user, which is a usable place on which a life of the user is based, by using a number of times that the foothold has been visited and a cumulative stay time based on the location information;
   inferring a nature of the foothold specific to the user by using algorithm for determining various footholds; and
   collecting information about the foothold.

2. The method of claim 1, further comprising:
   determining a home where the user resides at and a workplace where the user works for a living among the footholds using the number of times that the foothold has been visited and the cumulative stay time;
   collecting commuting route pattern information;
   calculating a probability for recognizing whether the user is commuting based on the commuting route pattern information; and
   determining a commuting instance.

3. The method of claim 1, wherein the collecting location information of the terminal comprises verifying GNSS-based location information using at least one of a distance accuracy, a moving distance, or a moving speed for correcting an error of GNSS-base location such as GNSS location jumping.

4. The method claim 1, wherein the determining the foothold using communication connectivity information of the terminal related to at least one of a wireless LAN, a short-range communication, or a mobile communication network.

5. The method of claim 1, wherein determining the foothold comprises selecting a charging commencement foothold of the terminal using charging information.

6. The method of claim 1, wherein the determining the foothold comprises selecting a foothold comprising a restaurant, a cafe, or a store which was visited, using received payment information.

7. The method of claim 1, wherein the determining the foothold comprises selecting, as a foothold, a place where the terminal has stayed for a period of time equal to or greater than a threshold value, based on location information corresponding to the place.

8. The method of claim 1, wherein the determining the foothold comprises determining a home where the user resides at and a workplace where the user works for a living among the footholds using the number of times that the corresponding foothold has been visited and the cumulative stay time of the corresponding foothold.

9. The method of claim 8, wherein the collecting the information about the foothold further comprises collecting commuting route pattern information,
   the collecting the commuting route pattern information comprising:
   collecting location information for a travel time between the home and the workplace;
   analyzing a commuting route between the home and the workplace using the location information for the travel time or the location information of the terminal;
   searching for a commuting route pattern based on a result of the analysis; and
   learning the commuting route pattern.

10. The method of claim 9, wherein the collecting the information about the foothold further comprises recognizing a commuting instance based on the route pattern information, the recognizing the commuting instance based on the route pattern information comprising:

measuring a departure angle which means how far a current position of the terminal is from the commuting route pattern by comparing first coordinates and second coordinates of the commuting route pattern with the current position of the terminal;

predicting a departure using the departure angle at a departure place in regards to an arrival place at a time of commuting to or from the workplace;

monitoring a travel route based on the commuting route pattern; and predicting arrival.

11. A terminal, comprising:

a data collector configured to collect location data of the terminal when an event occurs data about the event occurring in the terminal, comprising at least one of a communication connection, a charging, or a user input;

a place learner configured to learn places where the event occurs by using the location data of the terminal; and a processor configured to determine a foothold specific to a user, which is a usable place on which a life of the user is based, by using a number of times that the foothold has been visited and a cumulative stay time among the places where the event occurs based on a learning result of the place learner, infer a nature of the foothold specific to the user by using an algorithm for determining various footholds, and collect data about the foothold.

12. The terminal of claim 11, wherein the processor is further configured to:

determine a home where the user resides at and a workplace where the user works for a living among the footholds using the number of times that the foothold has been visited and the cumulative stay time, collect routing pattern information commuting between the home and the workplace, calculate a probability for recognizing whether the user is commuting based on the commuting route pattern information; and determine a commuting instance.

13. The terminal of claim 10, wherein the processor verifies GNSS-based location data by using at least one of a distance accuracy, a moving distance, or a moving speed for correcting an error of GNSS-base location such as GNSS location jumping.

14. The terminal of claim 11, wherein the data collector is configured to comprise a communication connectivity data producer configured to generate location data of a communication connection foothold to which the terminal is communicatively connected via at least one of a wireless LAN, a short-range communication, or a mobile communication network, and wherein the processor is configured to select the communication connection foothold based on a learning result of the place learner performing learning using the location data of the communication connection foothold.

15. The terminal of claim 11, wherein the data collector comprises a battery data producer configured to collect location data of a charging foothold where charging of the terminal begins, and wherein the processor is configured to select the charging foothold based on a learning result of the place learner performing learning using the location data of the charging foothold.

16. The terminal of claim 11, wherein the data collector comprises a payment data generator configured to generate location data of a payment foothold where the terminal receives the payment data, and wherein the processor is configured to select the payment foothold based on a learning result of the place learner performing learning using the location data of the payment foothold.

17. The terminal of claim 11, wherein the processor is configured to select a place as a foothold based on a learning result of the place learner performing learning using location data of the place where the terminal stayed for a period of time greater than or equal to a threshold value.

18. The terminal of claim 11, wherein the processor is configured to determine a home where the user resides at and a workplace where the user works for a living among the footholds by using a number of days that the corresponding foothold has been visited and a cumulative visit time of the corresponding foothold.

19. The terminal of claim 18, further comprising a route pattern learner configured to learn a commuting route pattern between the home and the workplace obtained by using the location data of the terminal collected for a period of travel time between the home and the workplace, wherein the processor is configured to collect commuting route pattern data by using route pattern learner.

20. The terminal of claim 19, wherein the processor is configured to recognize a commuting instance based on the commuting route pattern data, by using processes for predicting departure using a departure angle at a departure place for an arrival place at a time of commuting to or from the workplace, monitoring a travel route based on the commuting route pattern, and predicting arrival.

* * * * *